(No Model.)

W. STEERS.
FLOWER POT TRAY.

No. 469,490. Patented Feb. 23, 1892.

WITNESSES
Henry B. Leach
Frank G. Parker

INVENTOR
William Steers

UNITED STATES PATENT OFFICE.

WILLIAM STEERS, OF BOSTON, MASSACHUSETTS.

FLOWER-POT TRAY.

SPECIFICATION forming part of Letters Patent No. 469,490, dated February 23, 1892.

Application filed August 5, 1891. Serial No. 401,770. (No model.)

*To all whom it may concern:*

Be it known that I, WILLIAM STEERS, of Boston, in the county of Suffolk and State of Massachusetts, have invented a new and useful Improvement in Flower-Pot Trays, of which the following, taken in connection with the accompanying drawings, is a specification.

The object of my invention is to provide an improved tray to be used instead of the ordinary saucer for flower-pots.

Figure 1:
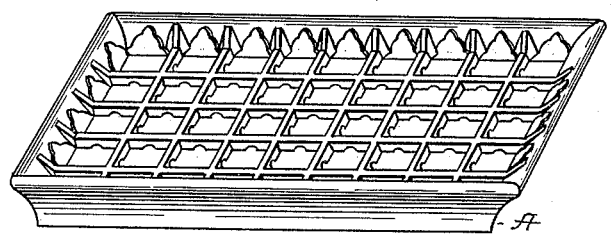
Figure 2:
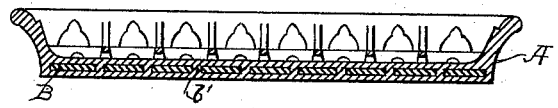
Figure 3:
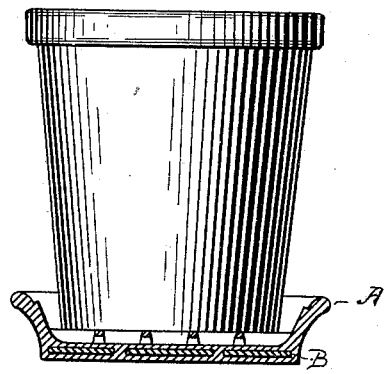
Figure 4:
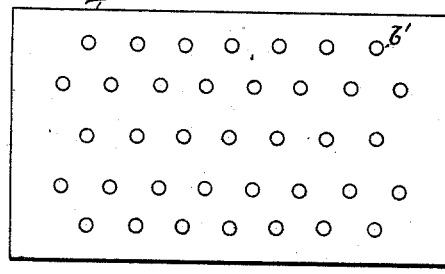

Figure 1 is a perspective view of the tray. Fig. 2 is a longitudinal section of the same. Fig. 3 is a latitudinal section of Fig. 1. Fig. 4 is a plan of the bottom plate.

The tray is of sufficient depth to hold the required amount of water to be absorbed by the contents of the pot. The tray is made, preferably, of india-rubber and will accommodate one or more pots at the same time. In order to overcome the flexibility of the rubber, the bottom of the tray is formed with a rigid metallic plate. Said plate is perforated and is inserted between the two layers of rubber forming the bottom. The rubber being pressed into the perforations of the plate unites both parts of the bottom, making it rigid. The metallic plate can be made without perforations, if desired.

Referring to the drawings, A, Fig. 1, shows the tray. Fig. 2 shows a sectional view of the tray. Fig. 3 shows a cross-section of tray with pot in position; and Fig. 4 shows a plan of the metallic plate B, with perforations $b'$.

I claim—

1. As a new article of manufacture, an india-rubber tray having shallow raised surfaces on its floor or bottom, in combination with a rigid metallic plate located in said floor, substantially as described, and for the purpose set forth.

2. An india-rubber tray with an inflexible floor or bottom, and an elastic rim arranged to hold water above the elevations on its floor, substantially as described, and for the purpose set forth.

In testimony whereof I have signed my name to this specification, in the presence of two subscribing witnesses, on this the 14th day of April, A. D. 1891.

WILLIAM STEERS.

Witnesses:
   FRANK G. PARKER,
   HENRY B. LEACH.